US009858736B2

(12) United States Patent
Tseng et al.

(10) Patent No.: US 9,858,736 B2
(45) Date of Patent: Jan. 2, 2018

(54) PASSWORD SETTING METHOD AND SYSTEM, AND LOCKSET MATCHING METHOD AND SYSTEM

(71) Applicant: USERSTAR INFORMATION SYSTEM CO., LTD., Chiayi County (TW)

(72) Inventors: Yin-Hung Tseng, Chiayi County (TW); Chun-Ming Lin, Chiayi County (TW); Yu-Tsun Chen, Chiayi County (TW)

(73) Assignee: Userstar Information System Co., Ltd., Chiayi County (TW)

( * ) Notice: Subject to any disclaimer, the term of this patent is extended or adjusted under 35 U.S.C. 154(b) by 0 days.

(21) Appl. No.: 15/235,629

(22) Filed: Aug. 12, 2016

(65) Prior Publication Data

US 2017/0046893 A1 Feb. 16, 2017

(30) Foreign Application Priority Data

Aug. 12, 2015 (TW) ............................ 104126298 A

(51) Int. Cl.
*G06F 7/04* (2006.01)
*G07C 9/00* (2006.01)
*H04B 1/38* (2015.01)

(52) U.S. Cl.
CPC ...... *G07C 9/00111* (2013.01); *G07C 9/00174* (2013.01); *G07C 9/00309* (2013.01); *G07C 2009/0088* (2013.01); *G07C 2009/00769* (2013.01); *G07C 2009/00793* (2013.01); *G07C 2209/04* (2013.01)

(58) Field of Classification Search
CPC ... B60R 25/24; B60R 25/248; G07C 9/00007; G07C 9/00039; G07C 9/00309
USPC ....... 340/5.5, 5.6, 5.61, 5.64, 5.65, 5.7, 5.73
See application file for complete search history.

(56) References Cited

U.S. PATENT DOCUMENTS

| | | | | |
|---|---|---|---|---|
| 8,058,971 | B2 * | 11/2011 | Harkins | G07C 9/00103 340/5.2 |
| 8,662,386 | B2 | 3/2014 | Radicella et al. | |
| 9,024,720 | B2 * | 5/2015 | Bliding | G07C 9/00103 340/5.61 |
| 9,465,827 | B1 * | 10/2016 | Cox | G06F 17/30312 |
| 2002/0180582 | A1 * | 12/2002 | Nielsen | G07C 9/00103 340/5.6 |
| 2004/0059925 | A1 | 3/2004 | Benhammou et al. | |
| 2005/0089201 | A1 * | 4/2005 | Blancas | G07C 9/00158 382/124 |
| 2006/0170533 | A1 * | 8/2006 | Chioiu | G07C 9/00103 340/5.61 |
| 2007/0013610 | A1 * | 1/2007 | Mooney | G07C 9/00119 345/2.1 |

(Continued)

*Primary Examiner* — Carlos E Garcia
(74) *Attorney, Agent, or Firm* — Muncy, Geissler, Olds & Lowe, P.C.

(57) ABSTRACT

A password setting method includes the following steps of: providing a lock body, which is configured with identification data; providing a reset device including a RFID, which has characteristic data; accessing the RFID to obtain the characteristic data; transmitting the characteristic data to the lock body; comparing the characteristic data and the identification data; and when the characteristic data matches the identification data, enabling a password setting function of the lock body. In addition, a password setting system and a lockset matching method and system are also disclosed.

10 Claims, 6 Drawing Sheets

(56) References Cited

U.S. PATENT DOCUMENTS

| | | | | |
|---|---|---|---|---|
| 2010/0081375 | A1* | 4/2010 | Rosenblatt | G08C 17/02 455/41.1 |
| 2012/0280789 | A1* | 11/2012 | Gerhardt | G07C 9/00309 340/5.61 |
| 2013/0314208 | A1* | 11/2013 | Risheq | G07C 9/00158 340/5.53 |
| 2014/0354398 | A1* | 12/2014 | Boday | G07C 9/00912 340/5.2 |
| 2015/0145647 | A1* | 5/2015 | Engel-Dahan | G07C 9/00571 340/5.61 |
| 2015/0179008 | A1* | 6/2015 | Sung | H04B 5/0056 340/5.61 |
| 2015/0379795 | A1* | 12/2015 | Wu | G07C 9/00309 340/5.61 |
| 2016/0093128 | A1* | 3/2016 | Shen | G07C 9/00015 340/5.6 |
| 2016/0149892 | A1* | 5/2016 | Sun | H04W 12/06 726/7 |
| 2017/0103592 | A1* | 4/2017 | Buttolo | G07C 9/00015 |

* cited by examiner

PASSWORD SETTING METHOD AND SYSTEM, AND LOCKSET MATCHING METHOD AND SYSTEM

CROSS REFERENCE TO RELATED APPLICATIONS

This Non-provisional application claims priority under 35 U.S.C. §119(a) on Patent Application No(s). 104126298 filed in Taiwan, Republic of China on Aug. 12, 2015, the entire contents of which are hereby incorporated by reference.

BACKGROUND OF THE INVENTION

Field of Invention

The present invention relates to a password setting method and system, and a lockset matching method and system, which can be cooperated with a portable device.

Related Art

The present electrical lock system usually includes an inductive card and an electrical lockset. The inductive card is a key, and the electrical lockset includes a card reader for reading the inductive card for performing the unlock action. After installing the electronic lockset, the initiation setup of the electronic lockset and the inductive cards must be executed before starting operation. At first, the user takes a mother inductive card to approach the card reader of the electronic lockset, and then the card reader reads the identification data of the mother inductive card and saves it as an identification data. Next, the card reader shows an operation instruction to input a new password. The user follows the operation instruction to input a new password as an administrator password so as to obtain the administrator privilege. Accordingly, the user can continuously operate to perform the matching setup of the mother inductive card and the electronic lockset. If the user forgets his/her administrator password, it is necessary to take the mother inductive card to approach the card reader for induction, and the card reader can read the identification data of the mother inductive card, which is compared with the stored identification data. If the identification data matches the identification data, the user is allowed to set a new administrator password.

However, the inductive card is inbuilt with a RFID storing some personal and private information, which can be copied by the wireless signal recorder. In addition, the card reader may not secure. For example, it is possible to install a copy chip in the card reader for stealing the information and data stored in the card reader. Therefore, it is an important subject to provide a password setting method and system, and a lockset matching method and system for preventing the information and data from being stolen.

SUMMARY OF THE INVENTION

In view of the foregoing, an objective of the present invention is to provide a password setting method and system and a lock body, which can set or reset the identification data of the lock boy through the wireless transmission between the lock body and a portable device.

In view of the foregoing, another objective of the present invention is to provide a lockset matching method and system that can use an operation apparatus to communicate with a lockset device and a lockset accessory. The lockset device of the lockset matching system can finish a matching procedure of the lockset matching accessory and the lockset device of the lockset matching system in an off-line situation (no network available) without the conventional card reader and reset button.

To achieve the above objectives, the present invention discloses a password setting method, which includes the following steps of: providing a lock body, which is configured with identification data; providing a reset device including a RFID, which has characteristic data; accessing the RFID to obtain the characteristic data; transmitting the characteristic data to the lock body; comparing the characteristic data and the identification data; and when the characteristic data matches the identification data, enabling a password setting function of the lock body.

In one embodiment, the characteristic data are tag information, or a combination of tag information and encoded tag information.

In one embodiment, the encoded tag information are digital data, image data or voice data.

In one embodiment, the step of transmitting the characteristic data to the lock body includes converting the characteristic data into encoded characteristic data according to an encoding algorithm, and transmitting the encoded characteristic data the lock body.

In one embodiment, the lock body is a physical lock, an e-file lock, or a circuit lock.

To achieve the above objectives, the present invention further discloses a lock body cooperated with a reset device, which includes a RFID having readable characteristic data. The lock body includes a memory module storing identification data, and a judgement module determining whether the character data matches the identification data or not, and when the character data matches the identification data, enabling a password setting function. The accessed characteristic data is transmitted to the lock body by wireless transmission.

In one embodiment, the characteristic data are tag information, or a combination of tag information and encoded tag information.

In one embodiment, the lock body is a physical lock, an e-file lock, or a circuit lock.

To achieve the above objectives, the present invention further discloses a lockset matching system including: a lockset accessory having a first identification value; an operation apparatus having an access/transmission device for accessing and transmitting the first identification value of the lockset accessory; and a lockset device having a second calculation device, a judgement module and a memory module, wherein after the lockset device receives the first identification value, the second calculation device generates a second identification value corresponding to the first identification value. After the lockset device generates the second identification value and the judgement module determines that the second identification value is identical to the first identification value, the first identification value is stored in the memory module so as to finish a matching procedure of the lockset matching system.

In one embodiment, the lockset accessory has a first calculation device for generating the first identification value. After the lockset device receives the first identification value from the operation apparatus, the second calculation device generates the second identification value corresponding to the first identification value according to the first identification value. After the lockset device generates the second identification value and the judgement module determines that the second identification value is identical to the first identification value, the first identification value is stored in the memory module of the lockset device so as to finish the matching procedure of the lockset matching system.

In one embodiment, the access/transmission device accesses and transmits the first identification value of the lockset accessory by a barcode scanner, NFC, RFID, Bluetooth, IrDA, ZigBee, UWB, IEEE or Hiper LAN.

To achieve the above objectives, the present also discloses a lockset matching method including the following steps of: generating a first identification value by a lockset accessory; accessing a first identification value of the lockset accessory by an access/transmission device of an operation apparatus; transmitting the first identification value to a lockset device by the access/transmission device of the operation apparatus; generating a second identification value corresponding to the first identification value by a second calculation device of the lockset device according to the first identification value; and determining whether the first identification value is identical to the second identification value, and if yes, storing the first identification value in the lockset device so as to finish a matching procedure.

As mentioned above, the password setting method of the invention is operated with the portable device of the user, so it can decrease the risk of information stolen. In addition, this invention sets or resets the identification data by wireless signal transmission, so that it is unnecessary to install a card reader in the lock body. Accordingly, the lock body can be an e-file lock or a circuit lock, thereby achieving the minimization or electronic purpose. Moreover, the lockset matching system of the invention can utilize an operation apparatus to manage the lockset device (e.g. setting or changing the administrator password of the lockset device) through the identification of the lockset accessory. Herein, the administrator password is used to add or delete the matching between the operation apparatus and the lockset device. After finishing the matching of the operation apparatus and the lockset device through the administrator password, it is possible to directly operate the operation apparatus to control the lockset device. Accordingly, the lockset device can finish a matching procedure of the lockset matching accessory and the lockset device through the operation of the operation apparatus in an off-line situation (no network available) without the card reader and reset button. This feature can achieve the purposes of easily operation and lower manufacturing cost of the lockset device.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
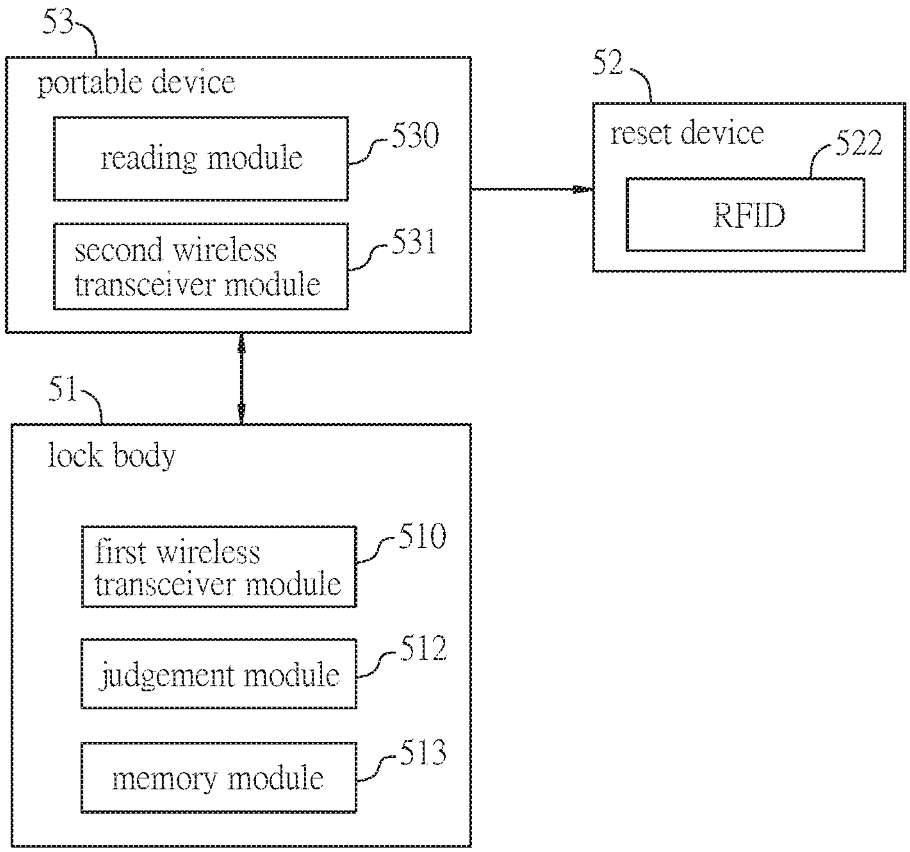
FIG. 1 is a block diagram of a lock system according to a first embodiment of the invention.

FIG. 1 is a block diagram of a lock system according to a first embodiment of the invention. As shown in FIG. 1, the lock system includes a lock body 51, a portable device 53 and a reset device 52. The lock body 51 includes a first wireless transceiver module 510, a judgement module 512 and a memory module 513. The portable device 53 includes a reading module 530 and a second wireless transceiver module 531. The reset device 52 includes a RFID 522, which has tag information. In this embodiment, the reset device 52 can be an inductive card, and the portable device 53 can be a smart phone. In general, the user has to perform an initial setup of the lock body 51 and the reset device 52. Firstly, the user utilizes the reading module 530 of the portable device 53 to read the tag information of the reset device 52. Next, the second wireless transceiver module 531 transmits the tag information to the first wireless transceiver module 510 of the lock body 51 by wireless transmission. Then, the tag information is stored in the memory module 513 and saved as identification data. Afterward, the first wireless transceiver module 510 of the lock body 51 transmits an operation message of inputting a new password to the second wireless transceiver module 531 of the portable device 53. Then, the user can operate the portable device 53 to input a new password as the administrator password, which is transmitted to the lock body 51 through the second wireless transceiver module 531 and then stored in the memory module 513 of the lock body 51. Accordingly, the initial setup is finished.

When the user forgets the administrator password, he or she can operate the portable device 53 to use the reading module 530 to retrieve the tag information of the reset device 52. Then, the second wireless transceiver module 531 transmits the tag information to the first wireless transceiver module 510 of the lock body 51. Next, the judgement module 512 of the lock body 51 compares the tag information with the identification data stored in the memory module 513. If the judgement module 512 determines that the tag information is identical to the identification data, the first wireless transceiver module 510 of the lock body 51 transmits an operation message of inputting a new password to the second wireless transceiver module 531 of the portable device 53. Afterward, the user can operate the portable device 53 to input a new password, which is then transmitted from the second wireless transceiver module 531 to the memory module 513 of the lock body 51, thereby finishing the reset procedure.

Referring to FIG. 1, the RFID 522 of the reset device 52 may include characteristic data, which includes tag information and encoded tag information. The encoded tag information can be inbuilt in the reset device 52 before shipping or be obtained by encoding the tag information based on an algorithm. For example, the reset device 52 is inbuilt with an algorithm circuit. When the portable device 53 is inducted with the reset device 52, the algorithm circuit can convert the tag information into the encoded tag information. Alternatively, if the reset device 52 is not inbuilt with an algorithm circuit, the user can use the portable device 53 to download the algorithm program provided by the vender of the lock boy 51 for converting the tag information into the encoded tag information. In both of the above mentioned approaches with the inbuilt algorithm circuit or the downloaded algorithm program, the RFID 522 contains the tag information and encoded tag information. Besides, the encoded tag information can be a digital data, an image data or a voice data, and this invention is not limited. For sake of easy understanding, the encoded tag information in the following paragraphs is a hexadecimal digital data for example.

The user can use the reading module 530 of the portable device 53 to read the characteristic data of the reset device 52 (the tag information and encoded tag information). Next, the second transceiver module 531 transmits the characteristic data to the first transceiver module 510 of the lock body 51 by wireless transmission. The characteristic data are stored in the memory module 513 as identification data. Afterward, the first wireless transceiver module 510 of the lock body 51 transmits the operation message of inputting a new password to the second transceiver module 531 of the portable device 53. Then, the user can operate the portable device 53 to input a new password as the administrator password, which is transmitted to the lock body 51 through the second wireless transceiver module 531 and then stored in the memory module 513 of the lock body 51. Accordingly, the initial setup is finished.

When the user forgets the administrator password, he or she can operate the portable device 53 to use the reading module 530 to retrieve the characteristic data of the reset device 52. Then, the second wireless transceiver module 531 transmits the characteristic data to the first wireless transceiver module 510 of the lock body 51. Next, the judgement module 512 of the lock body 51 compares the characteristic data with the identification data stored in the memory module 513. If the judgement module 512 determines that the characteristic data is identical to the identification data, the first wireless transceiver module 510 of the lock body 51 transmits an operation message of inputting a new password to the second wireless transceiver module 531 of the portable device 53. Afterward, the user can operate the portable device 53 to input a new password, which is then transmitted from the second wireless transceiver module 531 to the memory module 513 of the lock body 51, thereby finishing the reset procedure.

Figure 2:
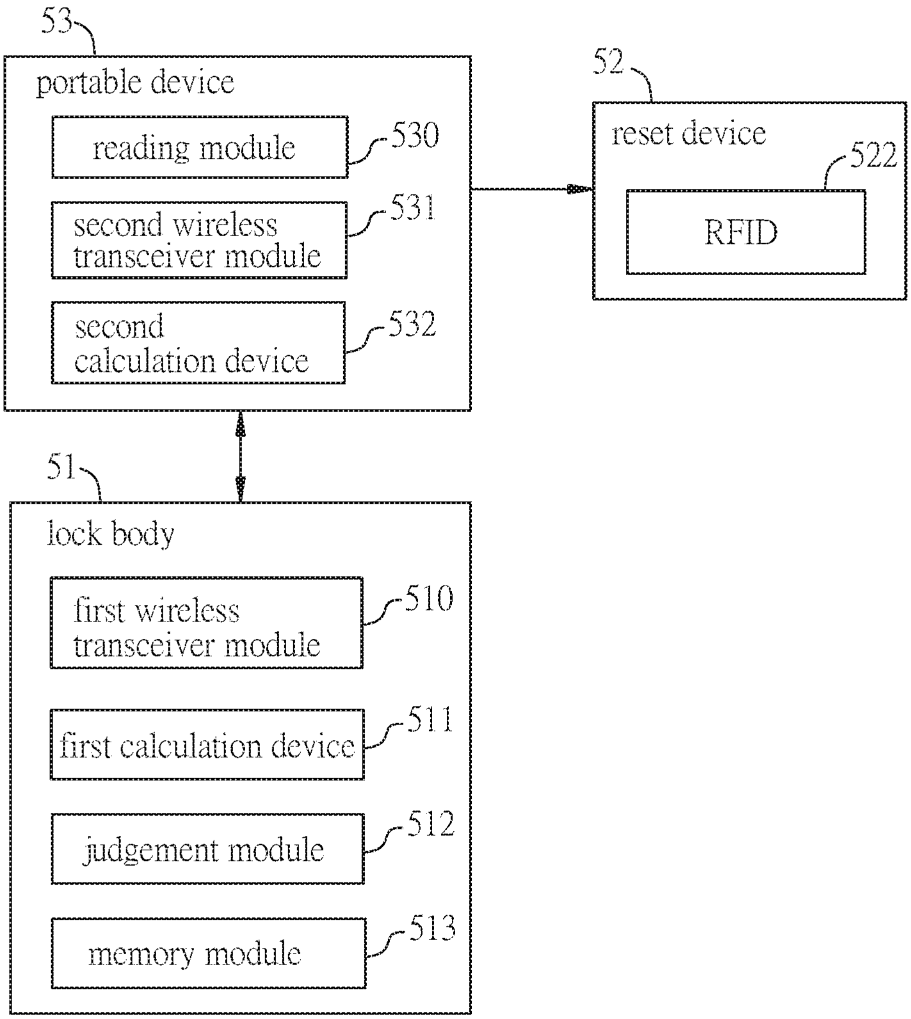
FIG. 2 is a block diagram of a lock system according to a second embodiment of the invention.

FIG. 2 is a block diagram of a lock system according to a second embodiment of the invention. Referring to FIG. 2, in order to reduce the risk of data stolen as transmitting between the portable device 53 and the lock body 51, the lock body 51 further includes a first calculation device 511, and the portable device 53 further includes a second calculation device 532. When the user forgets the administrator password, he or she can operate the portable device 53 to use the reading module 530 to retrieve the characteristic data of the reset device 52. The second calculation device 532 performs an encoding algorithm to convert the characteristic data into encoded characteristic data. Then, the second wireless transceiver module 531 transmits the encoded characteristic data to the lock body 51. Next, the first calculation device 511 also performs the encoding algorithm, which is the same as that performed by the second calculation device 532, to convert the identification data stored in the memory module 513 into encoded identification data. If the judgement module 512 determines that the encoded characteristic data is identical to the encoded identification data, the first wireless transceiver module 510 of the lock body 51 transmits an operation message of inputting a new password to the second wireless transceiver module 531 of the portable device 53. Afterward, the user can operate the portable device 53 to input a new password, which is then transmitted from the second wireless transceiver module 531 to the memory module 513 of the lock body 51, thereby finishing the reset procedure. In this embodiment, the encoding algorithm is an RSA encoding algorithm.

Figure 3:
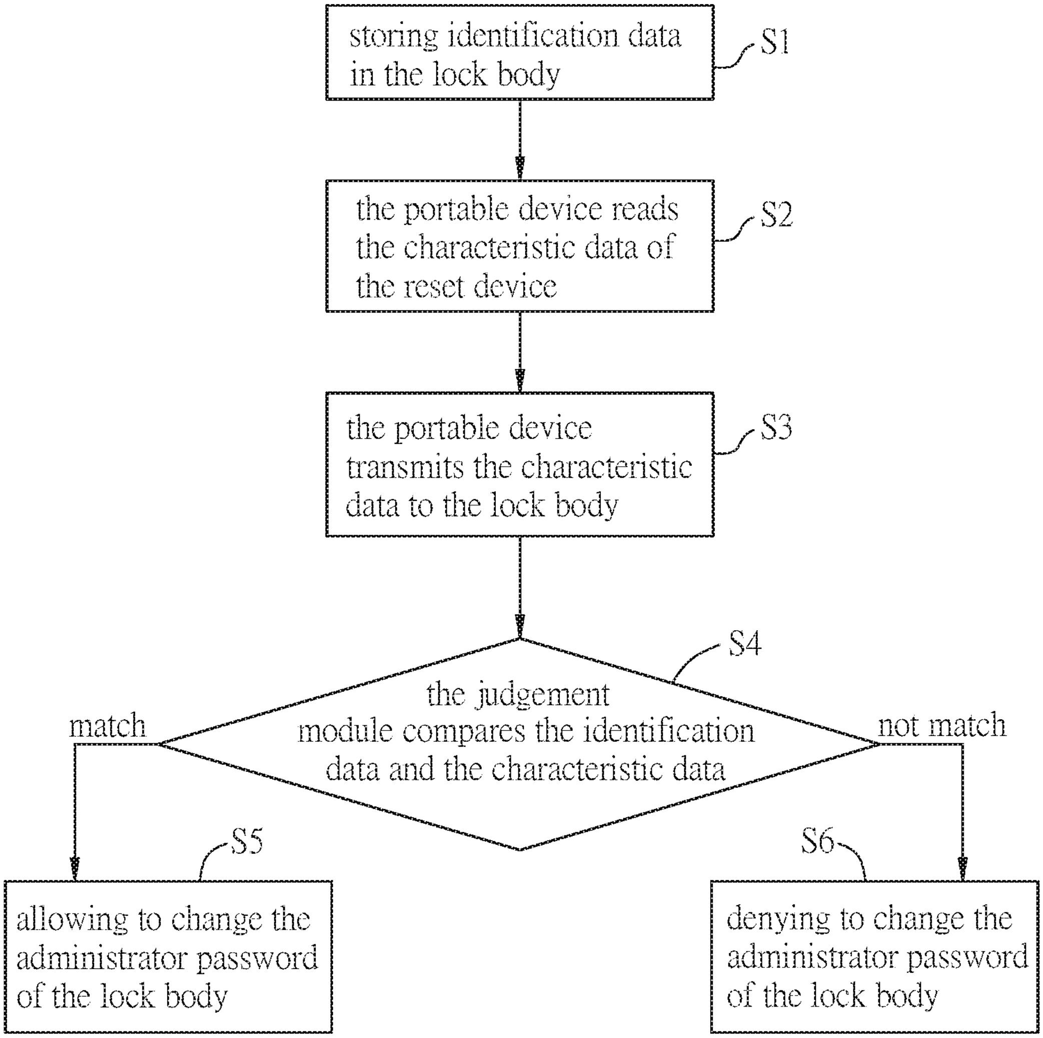
FIG. 3 is a flow chart of a password setting method according to an embodiment of the invention.

FIG. 3 is a flow chart of a password setting method according to an embodiment of the invention. As shown in FIG. 3, the password setting method includes the following steps of: storing identification data in the lock body 51 (step S1); the portable device 53 reads the characteristic data of the reset device 52 (step S2); the portable device 53 transmits the characteristic data to the lock body 51 (step S3); the judgement module 512 compares the identification data and the characteristic data (step S4); if the judgement module 512 determines that the identification data is identical to the characteristic data, allowing to change the administrator password of the lock body 51 (step S5); if the judgement module 512 determines that the identification data is not identical to the characteristic data, denying to change the administrator password of the lock body 51 (step S6).

Figure 4:
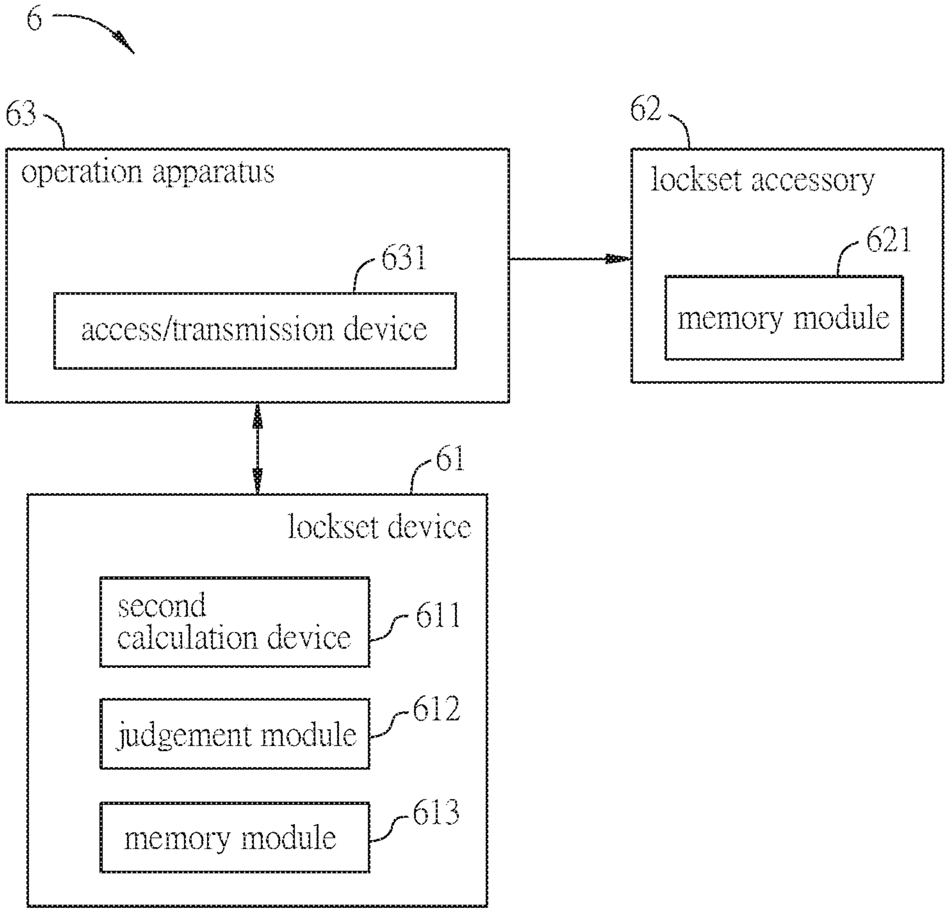
FIG. 4 is a block diagram of a lockset matching system according to a first embodiment of the invention.

FIG. 4 is a block diagram of a lockset matching system according to a first embodiment of the invention. Referring to FIG. 4, the lockset matching system 6 includes a lockset device 61, a lockset accessory 62 and an operation apparatus 63 configured with an access/transmission device 631. The operation apparatus 63 can be, for example, a smart phone. The lockset device 61 has a second calculation device 611, a judgement module 612 and a memory module 613. The second calculation device 611 can receive external information and execute an algorithm to perform an encoding or decoding calculation. The judgement module 612 can compare and determine whether the calculated identification value matches or not. The memory module 613 can store the algorithm and one or more matching information. The lockset accessory 62 has a unique ID (UID). In practice, a specific device, such as an encoding calculation device configured at the production line, can perform an encoding calculation with the UID so as to generate an identification value corresponding to the UID. The UID and the encoded identification value can be printed as words or QR code, or stored in the tag or RFID. Afterward, the UID or encoded identification value (a first identification value) is attached to the lockset accessory 62 as an inductive card.

In addition, it is also possible to set an additional device (e.g. a calculation device in the production line) to generate a new code corresponding to the first identification value attached to the lockset accessory 62, and the new code can be further calculated to generate an encoded code based on the same encoding calculation algorithm. When the lockset accessory 62 doesn't have the UID or the UID can't be read, it is possible to use this way to generate the first identification value. In this embodiment, the first identification value of the new code can be generated by the same way as the additional device. For example, the additional device can control the first identification value of the new code based on a preset table.

When the lockset accessory 62 is configured with a memory module 621, the first identification value of the lockset accessory 62 can be stored in the memory module 621. Herein, the memory module 621 can be an IC chip with a storage function. In this embodiment, the first identification value is attached to the lockset accessory 62 before shipping the lockset accessory 62, or the first identification value is written into the memory module 621 of the lockset accessory 62. The invention is not limited to this.

Referring to FIG. 4, after the access/transmission device 631 of the operation apparatus 63 accesses the first identification value of the lockset accessory 62, the first identification value of the lockset accessory 62 is transmitted to the lockset device 61 through the access/transmission device 631. After the lockset device 61 receives the first identification value, the second calculation device 611 performs an encoding or decoding algorithm with the first identification value to generate a second identification value. Afterward, the judgement module 612 compares the first identification value and the second identification value obtained by the second operation device 611 so as to determine whether the second identification value is identical to the first identification value or not. The second operation device 611 can perform the algorithm stored in the memory module 613 to obtain the second identification value, and then the judgement module 612 compares the second identification value with the first identification value stored in the memory module 613. When it determines that the second identification value is identical to the first identification value, the UID is stored in the memory module 613. The access/transmission device 631 can access the UID of the lockset accessory 62 and the first identification value corresponding to the UID by a barcode scanner, NFC (near field communication), RFID, Bluetooth, or the likes. In addition, the wireless transmission can be IrDA (infrared data association), UWB (ultra-wideband), IEEE or Hiper LAN, or any other short or middle-long distance communication, and this invention is not limited. In the above embodiments of the invention, the operation apparatus 63 can be a smart phone, a smart watch, a smart bracelet, a tablet computer, a PC, a notebook computer, or other portable electronic devices, and this invention is not limited.

In the first embodiment of the invention, if the lockset accessory 62 and the lockset device 61 are in the same lockset matching system 6, the second calculation device 611 of the lockset device 61 and the lockset accessory 62 utilize the same algorithm to obtain the second identification value and the first identification value, respectively. Accordingly, when the lockset accessory 62 and the lockset device 61 are in the same lockset matching system 6, the second identification value should match the first identification value. Thus, after finishing the matching procedure of the lockset accessory 62 and the lockset device 61, the lockset accessory 62 and the lockset device 61 can be placed at different positions. For example, the lockset accessory 62 is kept by the administrator, while the lockset device 61 is a lock for securing a drawer. Once a user wants to open the drawer but doesn't have permission, he/she has to bring an operation apparatus 63 to the administrator, and then retrieves the first identification value of the lockset accessory 62 by the access/transmission device 631 of the operation apparatus 63. Then, this user can transmit the retrieved first identification value of the lockset accessory 62 to the lockset device 61. After receiving the first identification value, the lockset device 62 performs an encoding or decoding algorithm to obtain a second identification value. Then, the judgement module 612 compares the first and second identification values. If the judgement module 612 determines that the first identification value is identical to the second identification value, it will send a confirmation message to indicate that this user has obtained the administrative right for the lockset device 61. Afterward, the matching procedure of the operation apparatus 63 and the lockset device 61 is finished, and then the user can operate the operation apparatus 63 to open the lockset of the drawer.

Figure 5:
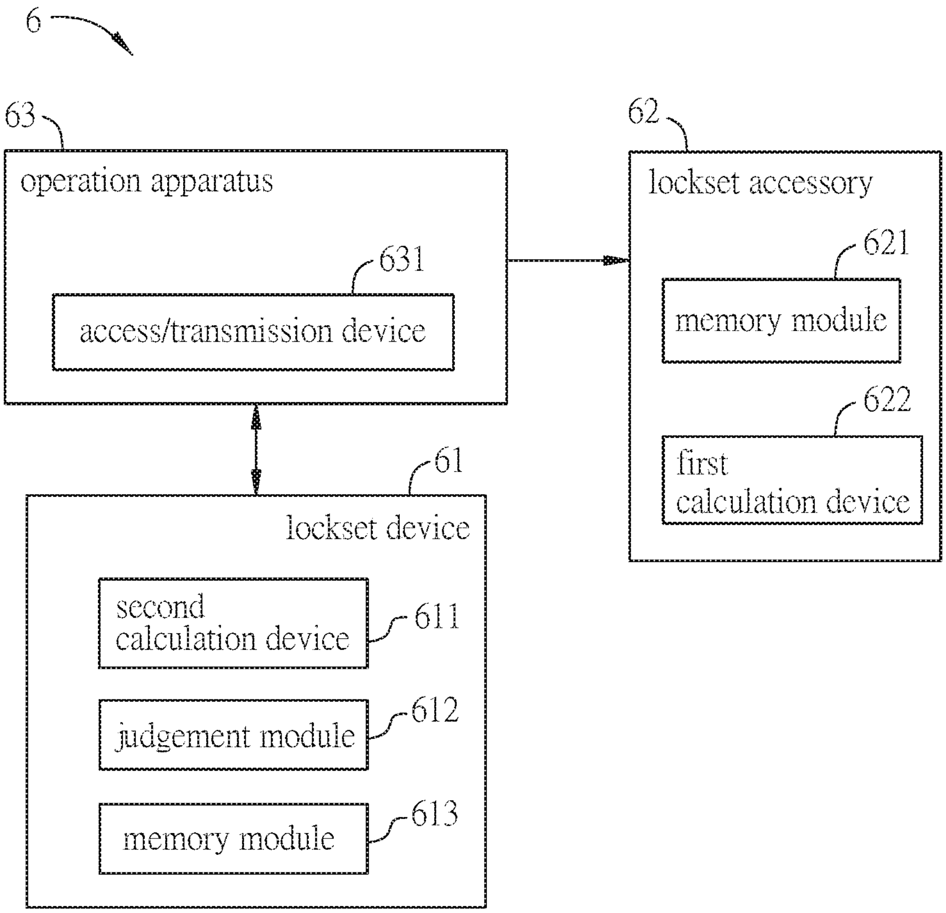
FIG. 5 is a block diagram of a lockset matching system according to a second embodiment of the invention.

FIG. 5 is a block diagram of a lockset matching system according to a second embodiment of the invention. In the second embodiment, the lockset accessory 62 has a UID. Besides, the lockset accessory 62 is also configured with a memory module 621, which can be an IC chip with a storage function, for storing at least one algorithm. In addition, the lockset accessory 62 further includes a first calculation device 622, which can calculate to generate an identification value corresponding to the UID according to the UID of the lockset accessory 62. Moreover, the lockset matching system 6 further includes an operation apparatus 63 (e.g. a smart phone), which is configured with an access/transmission device 631. The access/transmission device 631 can be an RFID reader, NFC antenna circuit, a mobile application, a scanner, a decoding and/or signal processing device, or the likes, and this invention is not limited. After the access/transmission device 631 of the operation apparatus 63 accesses the UID of the lockset accessory 62, the first calculation device 622 of the lockset accessory 62 will perform an encoding calculation with respective to the UID so as to obtain an identification value corresponding to the UID. Herein, the UID and the identification value corresponding to the UID are together named a first identification value. In this procedure, the first calculation device 622 can calculate according to the algorithm stored in the memory module 621, and the obtained first identification value can also be stored in the memory module 621. Otherwise, the obtained identification value can be transmitted to the operation apparatus 63.

In addition, it is also possible to set an additional device (e.g. a calculation device in the production line) to generate the first identification value attached to the lockset accessory 62. When the lockset accessory 62 doesn't have the UID or the UID can't be read, it is possible to use this way to generate the first identification value. In this embodiment, the first identification value of the new code can be generated by the same way as the additional device. For example, the additional device can control the first identification value of the new code based on a preset table. Besides, the obtained first identification value can be stored in the memory module 621, or directly transmitted to the operation apparatus.

Referring to FIG. 5, the lockset device 61 is configured with a second calculation device 611, a judgement module 612 and a memory module 613. The second calculation device 611 can receive external information and execute an algorithm to perform an encoding calculation. The judgement module 612 can compare and determine whether the calculated identification value matches or not. The memory module 613 can store the algorithm and one or more matching information. In this embodiment, the lockset accessory 62 and the lockset device 61 of the lockset matching system 6 can wirelessly communicate with the operation apparatus 63 (e.g. a smart phone). The access/transmission device 631 of the operation apparatus 63 can sense or read the lockset accessory 62. In practice, the access/transmission device 631 can access the UID of the lockset accessory 62 and the first identification value corresponding to the UID by a barcode scanner, NFC (near field communication), RFID, Bluetooth, or the likes. In addition, the wireless transmission can be IrDA (infrared data association), UWB (ultra-wideband), IEEE or Hiper LAN, or any other short or middle-long distance communication, and this invention is not limited. In the above embodiments of the invention, the operation apparatus 63 can be a smart phone, a smart watch, a smart bracelet, a tablet computer, a PC, a notebook computer, or other portable electronic devices, and this invention is not limited.

After the access/transmission device 631 of the operation apparatus 63 (e.g. a smart phone) receives the first identification value of the lockset accessory 62 (e.g. the new code, UID and the encoded identification value corresponding to the UID), the first identification value of the lockset accessory 62 is transmitted to the lockset device 61 through the access/transmission device 631. After the lockset device 61 receives the data from the access/transmission device 631, the second calculation device 611 performs an encoding calculation with respective to the UID of the lockset accessory 62 so as to obtain a second identification value. Then, the judgement module 612 compares the received first identification value and the second identification value obtained by the second calculation device 611. If the judgement module 612 determines that the first identification value is identical to the second identification value, the first identification value of the lockset accessory will be stored in the memory module 613 of the lockset device 61. In addition, after receiving the data from the access/transmission device 631, the lockset device 61 may optionally perform a decoding calculation with respective to the identification value corresponding to the UID of the first identification value so as to obtain a second identification value. Besides, after the lockset device 61 receives the new code from the access/transmission device 631, the second calculation device 611 may optionally use the same preset table to generate the second identification value. Since the same preset table is used, the second identification value generated by the second calculation device 611 is identical to the new code transmitted from the access/transmission device 631. In this procedure, the second calculation device 611 can perform the algorithm stored in the memory module 613, and the obtained second identification value can be also stored in the memory module 613. In the second embodiment, the lockset accessory 62 is configured with a memory module 621 for storing at least an encoding/decoding/new code generating algorithm. Besides, the lockset accessory 62 is configured with a second calculation device 622, which can calculate according to the UID of the lockset accessory 62 to generate an identification value corresponding to the UID, or generate the new code according to the setup. The generated identification value and new code are together named as a first identification value. If the lockset accessory 62 and the lockset device 61 are in the same lockset matching system 6, the second calculation device 611 of the lockset device 61 and the first calculation device 622 of the lockset accessory 62 utilize the same encoding/decoding/new code generating algorithm to obtain the second identification value and the first identification value, respectively. Accordingly, when the lockset accessory 62 and the lockset device 61 are in the same lockset matching system 6, the second identification value should match the first identification value.

In the second embodiment, the lockset accessory 62 is configured with a memory module 621 for storing at least one algorithm. The first calculation device 622 of the lockset accessory 62 can calculate with respective to the UID of the lockset accessory 62 so as to generate a first identification value corresponding to the UID. Then, the first identification value is stored in the memory module 621. If the lockset accessory 62 and the lockset device 61 are in the same lockset matching system 6, the second calculation device 611 of the lockset device 61 and the first calculation device 622 of the lockset accessory 62 utilize the same algorithm to obtain the second identification value and the first identification value, respectively. Accordingly, when the lockset accessory 62 and the lockset device 61 are in the same lockset matching system 6, the second identification value should match the first identification value. Similarly, after finishing the matching procedure of the lockset accessory 62 and the lockset device 61 of the lockset matching system 6, the lockset accessory 62 and the lockset device 61 can be placed at different positions or areas. For example, the lockset accessory 62 is kept by the administrator, while the lockset device 61 is a lock for securing a drawer. Once a user wants to open the drawer but doesn't have permission, he/she has to bring an operation apparatus 63 to the administrator, and then retrieves the UID and first identification value of the lockset accessory 62 by the access/transmission device 631 of the operation apparatus 63. Then, this user can transmit the retrieved UID and first identification value of the lockset accessory 62 to the lockset device 61. After receiving the first identification value, the lockset device 62 performs an encoding or decoding algorithm to obtain a second identification value. Then, the judgement module 612 compares the first and second identification values. If the judgement module 612 determines that the first identification value is identical to the second identification value, it will send a confirmation message to indicate that this user has obtained the administrative right for the lockset device 61. Afterward, the matching procedure of the operation apparatus 63 and the lockset device 61 is finished, and then the user can operate the operation apparatus 63 to open the lockset of the drawer.

In this embodiment, the lockset device 61 is not configured with any card reader, and the user can use the operation apparatus 63 to read the information of the lockset accessory 62. Thus, the matching procedure of the lockset accessory 62 and the lockset device 61 can be performed by the operation apparatus 63. In addition, any lockset accessory 62 can be set as a mother inductive card. Moreover, the lockset device 61 of this embodiment doesn't need a reset button, and the user can utilize the operation apparatus 63 to retrieve the administrator password for setting or deleting the matching of the operation apparatus 63 and the lockset device 61. Besides, when the user forgets the administrator password of the lockset device 61, the operation apparatus 63 can read the matched lockset accessory 62 to renew the administrator password.

Figure 6:
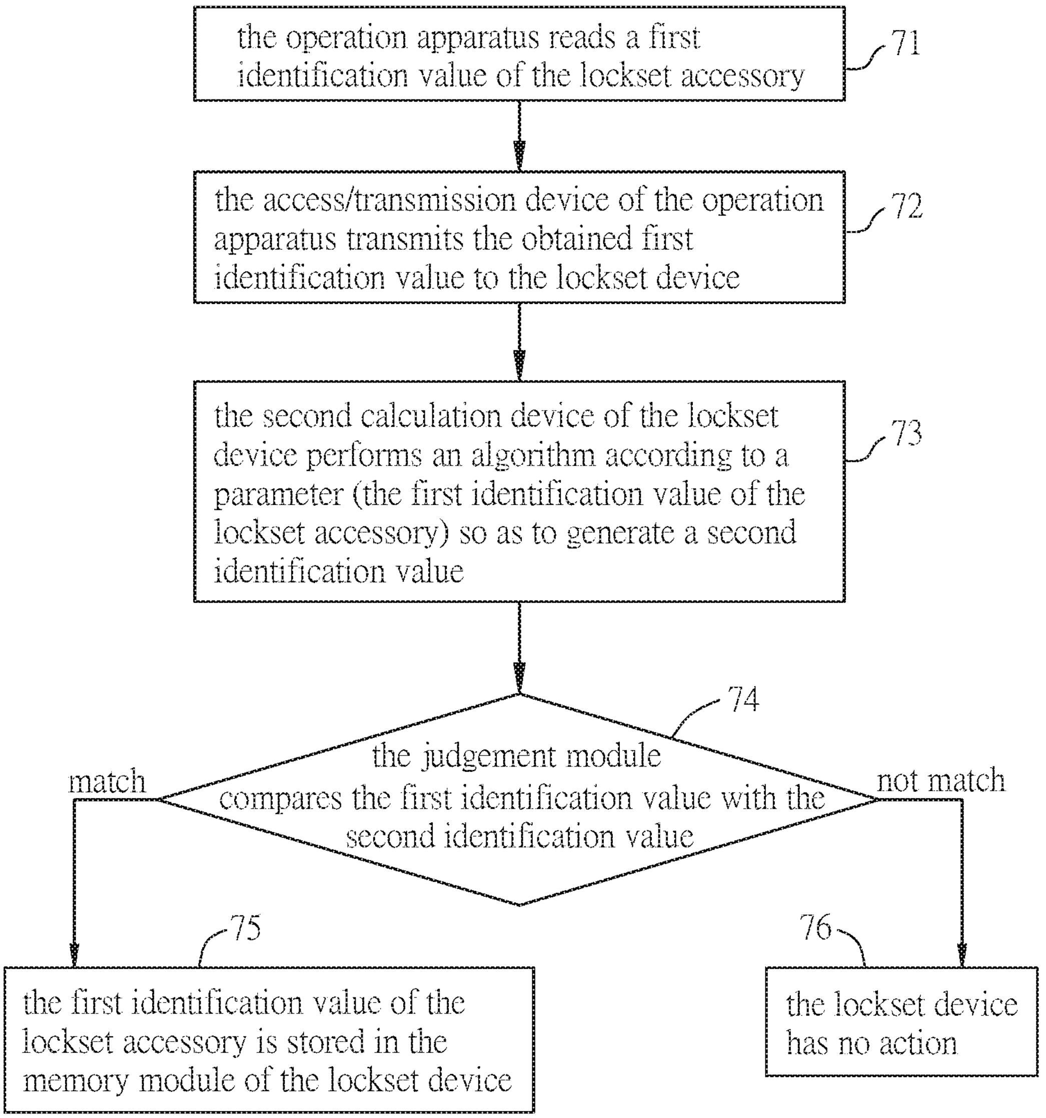
FIG. 6 is a flow chart showing the setup procedure of the lockset matching system.

FIG. 6 is a flow chart showing the setup procedure of the lockset matching system. As shown in FIG. 6, the setup procedure of the lockset matching system includes the following steps. In a step 71, the operation apparatus reads a first identification value of the lockset accessory. The operation apparatus 63 (e.g. a smart phone) can read a first identification value of the lockset accessory 62 (e.g. the new code, UID and encoded identification value corresponding to the UID). When the lockset accessory 62 isn't configured with the first calculation device 622, the operation apparatus 63 (e.g. a smart device with access/transmission function) can perform an encoding calculation with respective to the UID of the lockset accessory 62 so as to obtain the first identification value, which is stored in the memory module 621 of the lockset accessory 62. Otherwise, the UID and first identification value can be converted into words or a QR code and then printed or attached on the lockset accessory 62. When the lockset accessory 62 is configured with the first calculation device 622, the first calculation device 622 can perform an encoding calculation based on the algorithm stored in the memory module 621 with respective to the UID of the lockset accessory 62 so as to obtain an identification value (the first identification value). Alternatively, the first calculation device 622 can generate a new code according to the settings, and the new code, UID and the identification value corresponding to the UID are together named as a first identification value. In a step 72, the access/transmission device 631 of the operation apparatus 63 (e.g. a smart device) transmits the obtained first identification value to the lockset device 61. In a step 73, the second calculation device of the lockset device performs an algorithm according to a parameter (the first identification value of the lockset accessory) so as to generate a second identification value. In practice, the lockset device 61 receives the first identification value of the lockset accessory 62 transmitted from the access/transmission device 631, and then the second calculation device 611 of the lockset device 61 can perform an encoding calculation based on an algorithm stored in the memory module 613 with using the parameter containing the UID of the lockset accessory 62 so as to generate the second identification value. Alternatively, the second calculation device 611 can perform a decoding calculation based on an algorithm stored in the memory module 613 with using the parameter containing the identification value corresponding to the UID so as to generate the second identification value. This invention is not limited. In a step 74, the judgement module compares the first identification value with the second identification value. If the judgement module determines that the first identification value is identical to the second identification value, a step 75 is then performed. In the step 75, the first identification value of the lockset accessory is stored in the memory module of the lockset device. In this step, the first identification value of the lockset accessory 62 is stored in the memory module 613 of the lockset device 61. If the judgement module determines that the first identification value isn't identical to the second identification value, a step 76 is then performed. In the step 76, the lockset device has no action.

In summary, the password setting method of the invention is operated with the portable device of the user, so it can decrease the risk of information stolen. In addition, this invention sets or resets the identification data by wireless signal transmission, so that it is unnecessary to install a card reader in the lock body. Accordingly, the lock body can be an e-file lock or a circuit lock, thereby achieving the minimization or electronic purpose. Moreover, the lockset matching system of the invention can utilize an operation apparatus to manage the lockset device (e.g. setting or changing the administrator password of the lockset device) through the identification of the lockset accessory. Herein, any lockset accessory can be set as a mother inductive card. After finishing the matching of the operation apparatus and the lockset device through the administrator password, it is possible to directly operate the operation apparatus to control the lockset device. Accordingly, the lockset device can finish a matching procedure of the lockset matching accessory and the lockset device through the operation of the operation apparatus in an off-line situation (no network available) without the card reader and reset button. This feature can achieve the purposes of easily operation and lower manufacturing cost of the lockset device.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A password setting method, comprising steps of:

providing a lock body, which stores identification data;

providing a reset device including a RFID tag, which has characteristic data having permission to trigger a password setting function of the lock body;

by using a portable device, accessing the RFID tag of the reset device to obtain the characteristic data;

by using the portable device, transmitting the characteristic data to the lock body;

by using the lock body, comparing the characteristic data and the identification data; and when the characteristic data matches the identification data, triggering and entering the password setting function of the lock body.

2. The password setting method of claim 1, wherein the step of transmitting the characteristic data to the lock body comprises:

converting the characteristic data into encoded characteristic data according to an encoding algorithm; and transmitting the encoded characteristic data to the lock body.

3. The password setting method of claim 1, wherein the lock body is a physical lock, an e-file lock, or a circuit lock.

4. The password setting method of claim 1, wherein the reset device is an inductive card.

5. The password setting method of claim 1, wherein the characteristic data are tag information, or a combination of tag information and encoded tag information.

6. The password setting method of claim 5, wherein the encoded tag information are digital data, image data or voice data.

7. A lock body indirectly cooperated with a reset device, which includes a RFID tag having readable characteristic data, the lock body comprising:

a wireless transceiver module wirelessly coupled to a portable device which accesses the RFID tag of the reset device to obtain the characteristic data and then transmits the obtained characteristic data to the wireless transceiver module, wherein the characteristic data has permission to trigger a password setting function of the lock body;

a memory module storing identification data; and a judgement module determining whether the characteristic data matches the identification data or not, and when the characteristic data matches the identification data, triggering and entering the password setting function.

8. The lock body of claim 7, wherein the characteristic data are tag information, or a combination of tag information and encoded tag information.

9. The lock body of claim 7, wherein the lock body is a physical lock, an e-file lock, or a circuit lock.

10. The lock body of claim 7, wherein the reset device is an inductive card.

* * * * *